US 8,352,860 B2

(12) United States Patent
Ishizuka et al.

(10) Patent No.: US 8,352,860 B2
(45) Date of Patent: *Jan. 8, 2013

(54) IMAGE PROCESSING DEVICE AND METHOD FOR NOTIFYING A USER OF AN INCLUDED COMPRESSED IMAGE

(75) Inventors: Ryuichi Ishizuka, Ebina (JP); Mari Kodama, Ebina (JP); Yasushi Nishide, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 971 days.

This patent is subject to a terminal disclaimer.

(21) Appl. No.: 12/285,938

(22) Filed: Oct. 16, 2008

(65) Prior Publication Data
US 2009/0066983 A1 Mar. 12, 2009

Related U.S. Application Data (63) Continuation of application No. 10/389,927, filed on Mar. 18, 2003, now Pat. No. 7,468,811.

(30) Foreign Application Priority Data

Oct. 28, 2002 (JP) ................................. 2002-313072

(51) Int. Cl.
*G06F 17/00* (2006.01)
(52) U.S. Cl. .......... 715/275; 715/273; 715/274; 358/1.9
(58) Field of Classification Search .......... 715/273–275; 358/1.9
See application file for complete search history.

(56) References Cited

U.S. PATENT DOCUMENTS

| 5,991,515 | A | 11/1999 | Fall et al. | |
| 6,064,429 | A * | 5/2000 | Belk et al. | 348/128 |
| 6,360,006 | B1 | 3/2002 | Wang | |
| 6,407,821 | B1 * | 6/2002 | Hohensee et al. | 358/1.15 |

(Continued)

FOREIGN PATENT DOCUMENTS

JP   A-2000-153661   6/2000

(Continued)

OTHER PUBLICATIONS

Eps jpeg combined search—Google Search.pdf, Aug. 4, 2011, contains: "eps image with jpeg compression—Google Search", "eps file with jpeg compression—Google Search", "eps (jpeg)—Google Search".*

(Continued)

*Primary Examiner* — Doug Hutton, Jr.
*Assistant Examiner* — Benjamin Smith
(74) *Attorney, Agent, or Firm* — Oliff & Berridge, PLC (57) ABSTRACT

The present invention provides an image processing device and an image processing method, which prevent printing mishaps from occurring in printed matter when a user performs a printing process without knowing a compressed image is included on a page layout. When a compressed image is detected, a warning is generated to request selection of the next process. For this reason, when interruption of printing is designated, the printing process may be interrupted. The use of a warning color or application of an outline may be designated, and a drawing setting may also be performed according to the designation. An output of a warning page is designated, and a setting may also be performed such that a print output is obtained by either extracting the compressed image or by deleting the compressed image.

18 Claims, 7 Drawing Sheets

U.S. PATENT DOCUMENTS

| | | | |
|---|---|---|---|
| 6,717,686 B1* | 4/2004 | Farros et al. | 358/1.1 |
| 6,938,051 B1* | 8/2005 | Burger et al. | 1/1 |
| 6,944,357 B2* | 9/2005 | Bossut et al. | 382/298 |
| 7,385,719 B2* | 6/2008 | Ohno et al. | 358/1.15 |
| 8,015,418 B2* | 9/2011 | Warnock et al. | 713/193 |
| 8,065,171 B2* | 11/2011 | Nguyen et al. | 705/5 |
| 2002/0159637 A1* | 10/2002 | Echigo et al. | 382/190 |
| 2003/0007695 A1* | 1/2003 | Bossut et al. | 382/239 |
| 2003/0053087 A1* | 3/2003 | Sekizawa et al. | 358/1.9 |
| 2003/0189730 A1* | 10/2003 | Enomoto | 358/3.26 |
| 2004/0017476 A1* | 1/2004 | Nagashima et al. | 348/207.2 |
| 2004/0027594 A1* | 2/2004 | Suzuki et al. | 358/1.2 |
| 2004/0080798 A1* | 4/2004 | Nishide et al. | 358/518 |
| 2004/0148274 A1* | 7/2004 | Warnock et al. | 707/2 |
| 2007/0146736 A1 | 6/2007 | Nishide et al. | |

FOREIGN PATENT DOCUMENTS

| | | |
|---|---|---|
| JP | A-2000-246862 | 9/2000 |
| JP | A-2000-341503 | 12/2000 |
| JP | A-2000-341504 | 12/2000 |
| JP | A-2002-187315 | 7/2002 |
| WO | WO 96/13781 | 5/1996 |

OTHER PUBLICATIONS http://www.epsconverter.com; "Convert EPS graphics to gif or jpg format, free online tool.pdf"; Aug. 4, 2011.* http://www.honeycombarchive.com/compress-jpeg-files.cfm; "How to Save EPS with JPEG Compression.pdf"; Aug. 4, 2011.*

* cited by examiner

```
┌─────────────────────────────────────────┐
│            WARNING MESSAGE              │
├─────────────────────────────────────────┤
│                                         │
│  TITLE: ○  ○  ○  ○                      │
│                                         │
│                        ☐ CONTINUATION   │
│      PRINTING PROCESS                   │
│                        ☐ INTERRUPTION   │
│                                         │
│         ( DISPLAY PREVIEW )  ( EXECUTION ) │
└─────────────────────────────────────────┘
```

FIG. 4B

```
┌─────────────────────────────────────────┐
│           PROCESS DESIGNATION           │
├─────────────────────────────────────────┤
│  TITLE: ○  ○  ○  ○                      │
│                                         │
│      ☐ COLOR CONVERSION   ☐ SET COLOR   │
│      ☐ OUTLINE            ☐ DESIGNATION ☐│
│      ☐ WARNING PAGE PRINT ☐ IMAGE EXTRACTION │
│      ☐ COLOR PRINT        ☐ IMAGE DELETION │
│                              ( EXECUTION ) │
└─────────────────────────────────────────┘
```

IMAGE PROCESSING DEVICE AND METHOD FOR NOTIFYING A USER OF AN INCLUDED COMPRESSED IMAGE

This is a Continuation of application Ser. No. 10/389,927 filed Mar. 18, 2003 and issued as U.S. Pat. No. 7,468,811. The disclosure of the prior application is hereby incorporated by reference herein in its entirety.

BACKGROUND

1. Field of the Invention

The present invention relates to an image processing method enabling an image corresponding to image data generated by various applications to be printed by a printer. More specifically, the invention relates to an image processing method for image data including a compressed image.

2. Description of the Related Art

With the digitalization of printing processing, Desktop Publishing (DTP) is rapidly expanding. With DTP, page layout are made by operations such as creating, processing, and editing of an image using various applications on processors such as personal computers or workstations. Film used for exposing a printing plate is generated on the basis of the page layout (image setter, RIP for plate), and a press plate for printing is generated by directly writing data to a printing plate, known as Computer to Plate.

In DTP, a separation process for separating an image of a page layout into colors of yellow ("Y"), magenta ("M"), cyan ("C"), and key (black or gray) ("K") is performed, and a printing plate is exposed on the basis of the respective image data. Thus, a press plate is made having a printing plate on which a halftone image is made.

Prior to printing an image using an actual press plate, proof may be performed. In this case, a page layout is displayed on a monitor, or an image is printed out with a print device such as a laser printer or a page printer using a function such as WYSIWYG.

In applications for DTP, operations such as creating, processing, and editing of an image are performed to make a page layout by color. However, when a printing process using a press plate is performed, in order to make the machine plate, the page layout must be separated into ink components of colors, i.e., C, M, Y, and K.

Therefore, image data has to be color-separated into colors C, M, Y, and K with an application for DTP or an image processing apparatus, called Raster Image Processor (RIP), having functions for converting image data or drawing command into bit map data.

When a layout (page layout) is made by using DTP applications, high-resolution image data is used to obtain sufficient image quality on a printed matter. However, since the high-resolution image data has a large volume (image size), a lot of processing time is required to print out drawing data or image data on a page layout, and sending the data takes a lot of time as well.

As a method of solving these problems, various image replacing servers using low-resolution images in layout operations are proposed (e.g., see Japanese Patent Application Laid-Open (JP-A) Nos. 2000-341503 and 2000-341504).

However, in these proposals, high-resolution images must be registered in advance for replacement. When images are frequently modified, when the duration of use of an image is short, or when an image is used only once, registered images must be frequently managed. For this reason, management for images becomes troublesome.

In recent years, with the progress of image compression technology, increasing numbers of users utilize image compression. In addition, it has been determined that image data subjected to high-level compression such as JPEG format is useful, and such images are often applied to make a page layout.

However, when complex image data obtained by performing a compression process such as a JPEG process to image data exists on a page layout applied to color separation, color separation is not properly performed, and data consisting of only K-color data is obtained with respect to the image.

In other words, in a standard printer, a color image is handled without performing color separation. For this reason, color printing can be performed. In order to print using a machine plate, however, the image data must be separated into C, M, Y and K plate for process color printing. At this time, for image data that demands complex processes, only a K-color image is output.

In this manner, when a page layout is being made with a printer, or when proof printing of the made layout is performed, the resultant image looks like a color image. However, when a printing process using a machine plate is performed, an image using only the K color is made on the printed matter and the printed matter is unsatisfactory due to the occurrence of printing trouble. This adversely affects the quality of the printed image.

SUMMARY

The present invention has been made in consideration of the above-described facts, and the objective is to propose an image processing device which, when a printing process is performed by using a press plate made by using image data, can prevent printing mishaps caused by the complexity of the image data.

In order to achieve the above objective, according to the invention, there is provided an image processing device which, on the basis of drawing data or image data of a page layout, which is made by an image processing terminal and on which images are arranged, performs image processing to make it possible to print out the images, including: a determining component for determining the types of the respective images arranged on the page layout; a setting component for setting a conversion process to the images when the images are of a preset type by the determining component; and a conversion component for performing image conversion on the basis of the setting by the setting component.

According to the invention, determination of whether the respective images on the page layout are compressed images that were subjected to data compression or not is made based on the image data. In this manner, when the image data of a corresponding image is image data of a compressed image that was subjected to a compression process such as JPEG format, the setting component sets the conversion process to the image.

The conversion component performs a process to the corresponding image based on the setting of the set component. For example, the image is made distinct and proper.

In the invention, the image processing device includes a notification component for notifying the image processing terminal of the determination result of the determination component, wherein the notification component may notify the image processing terminal that the corresponding image was detected.

In the invention, the image processing device includes a selection component for selecting a conversion process for the image obtained by the setting component, wherein the selection component may make it possible to select the conversion process.

In the invention, the setting component may set a conversion process such that the image is converted into a predetermined color, and the setting component may delete the image from the page layout.

The setting component may set so as to extract the image and convert it to a printable format and further so as to extract the compressed image and convert it to a printable format.

When the setting component described above is used, the image that has been identified as a compressed image by the determining component can be made distinct.

According to another aspect of the invention, there is provided an image processing method which, on the basis of drawing data or image data of a page layout, which are made by an image processing terminal and on which images are arranged, processes an image to make it printable, comprising the steps of: (a) deciding whether the images arranged on the page layout are compressed images that were subjected to data compression or not; (b) setting a conversion process to the images when the images are compressed images in the step (a); and (c) converting an image based on the setting of step (b).

As described above, according to the invention, the presence/absence of a compressed image, which causes defects in the finished printing on the page layout, is detected, and image processing is performed such that the detected image is clearly distinguished. In this manner, excellent effects such as the reliable avoidance of printing trouble can be obtained, even when a machine plate is made without the user being aware of the presence of a compressed image.

DETAILED DESCRIPTION OF EMBODIMENTS

Figure 1:
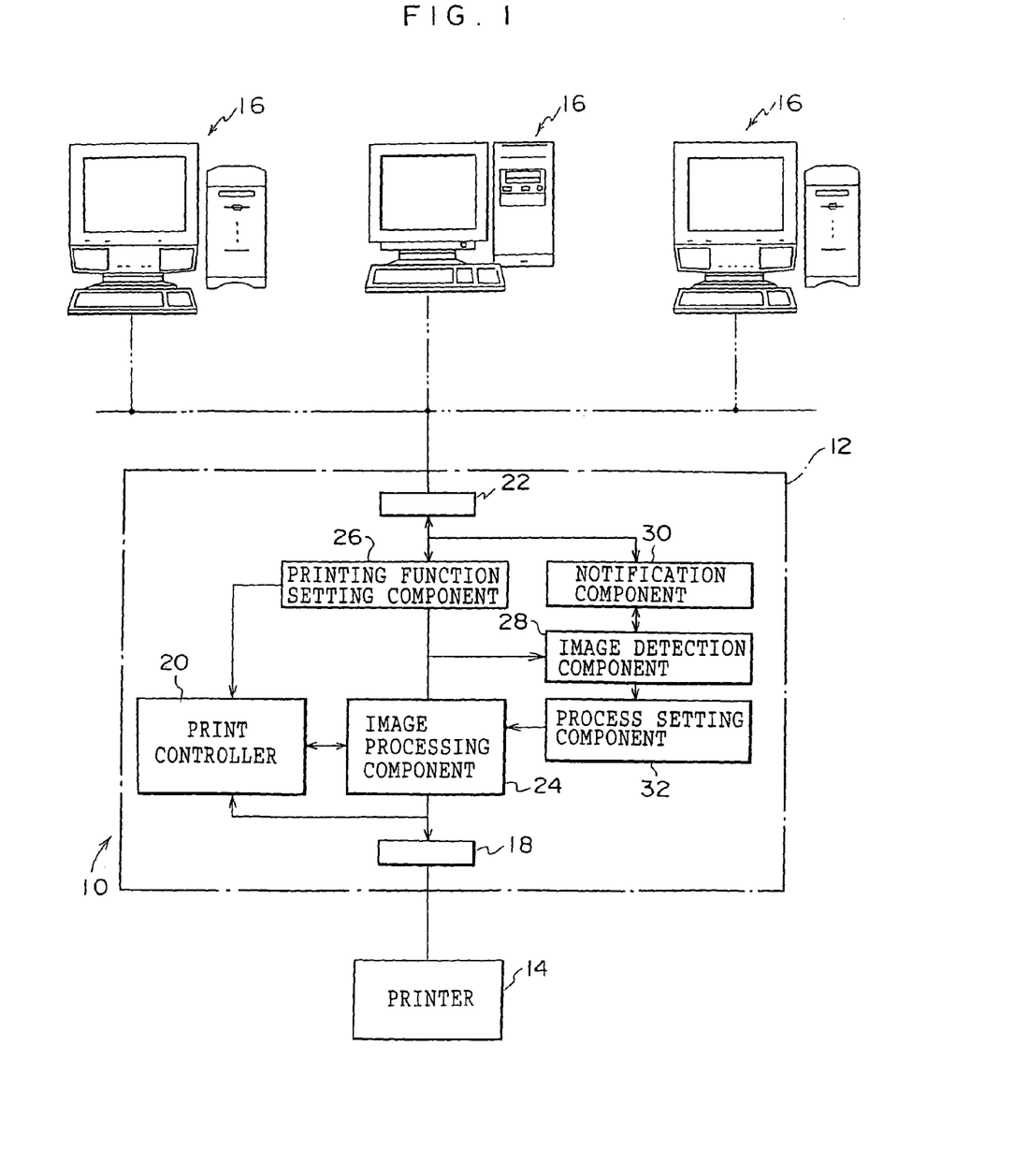
FIG. 1 is a schematic diagram showing a print system and a print server, which are applied to an embodiment of the present invention.

An embodiment of the present invention will be described below with reference to the accompanying drawings. FIG. 1 shows the schematic configuration of a print system 10 applied to this embodiment. The print system 10 comprises an image processing device 12 constituted by adding a PCI board having a predetermined function to a personal computer (PC) having a general configuration. In this image processing device 12, a printer 14 is connected as a print output device to make it possible to print out an image processed by the image processing device 12.

In addition, a personal computer, a workstation, or the like is connected as a client terminal 16 to image processing device 12. The client terminal 16 can be used in DTP for performing image processing such as creation, processing, edition, and the like of an image by using various applications. The image processing device 12 performs a printing process on the basis of a drawing instruction input from these client terminals 16.

More specifically, in the print system 10, the image processing device 12 has the function of a print server (in the following description, the image processing device 12 will be referred to as a "print server 12"). As the print system 10, a system in which a plurality of printers 14 is connected to the print server 12 may be used. In addition, the plurality of client terminals 16 may be connected to the print server 12 through a network such as a LAN or a WAN.

In the print server 12 used in this embodiment, an external memory such as ROM, RAM, or HD is arranged. The print server 12 is operated by an operating program stored in the ROM, and has a general configuration which performs processing to a system graphic, an image, characters, a table, or the like on the basis of the program stored in the ROM or the external memory.

The print server 12 comprises an input device such as a keyboard or a mouse and a display device such as a CRT display. In the print server 12, a printing process can also be performed to a display image on the display device (WYSIWYG function).

In the print server 12, a bidirectional interface 18 such as Ethernet® and a print controller 20 are arranged, and the print controller 20 is connected to the printer 14 through the bidirectional interface 18. In the print server 12, an image processing component 24 and a print function setting component 26 are formed.

A network interface 22 is arranged in the print server 12. The network interface 22 receives an image file and a drawing instruction as a print job from the client terminal 16 through the network interface 22. The print server 12 is generally configured to perform printing based on the drawing instruction.

The client terminal 16 uses various DTP applications such as Photoshop and Illustrator (both of which are trade-names of Adobe Systems Incorporated in the U.S.A) and QuarkXPress (trade-name of Quark in the U.S.A.) to perform image processing such as creation, processing, and editing of an image, and makes image data of a page layout or the like (to be referred to as a "page layout" hereinafter).

The page layout made by the client terminal 16 is color-separated (separated) into CMYK process colors or the like. The resultant page layout is used to form a film used in exposure of a printing plate in a color electric pre-press system (CEPS), or is used in exposure of a printing plate in direct plate making (CTP). A printing process is performed by a machine plate made on the basis of the page layout.

In the DTP, prior to creation of a machine plate based on a page layout, proof printing for making a proofing printed matter (proof) called a color proof or the like. On the basis of the proof printing, the page layout is proofed. In the print system 10 applied to this embodiment, the proof can be made.

When the proof printing is performed, a drawing instruction and an image file including a page layout are output as a print job from the client terminal 16 to the print server 12. In this manner, the print server 12 performs the printing process based on the page layout.

The page layouts input from the client terminal 16 may be page layouts of CMYK format or page layouts of RGB format, or page formats consisting of page formats of CMYK format and page formats of RGB format. In any case, the page layouts are composite outputs.

The print function setting component 26 reads a setting of a printing function on the drawing instruction of the print job to set a printing function used when image processing and a printing process. The setting of the printing function is not limited to the setting on the print job. For example, an application name used for making a print job by the print server 12 is extracted, and a set value which is set and stored in advance on the basis of the extraction result may be used in the setting of the printing function.

The image processing component 24 of the print server 12 performs a RIP process or the like for making Raster data obtained by separating the page layout into CMYK colors.

In the print server 12, the Raster data is output to the printer 14 under the control of the print controller 20, so that a printed matter depending on the page layout output from the client terminal 16 can be obtained.

In the print server 12, an image detection component 28, a notification component 30, and a process setting component 32 are arranged.

The image detection component 28 detects an image of a preset type from the images on the page layout. In this embodiment, for example, a compressed image obtained by compressing image data by JPEG format or the like is detected as an example.

In the client terminal 16, by using various applications for DTP, processing such as creation, processing, and edition of an image is performed to make a page layout. At this time, the page layout can also be made by using an image subjected to a compression process by one of various compression formats.

It is assumed that image data compressed by a compression format is on the page layout. In this case, when the page layout is separated into CMYK-color plates, even though the image on the page layout is a color image, the image is converted into K-color plate. For this reason, when printing is performed with the machine plate, which was made from the page layout, an image consisting of compressed image data appears as a K-color image (black or gray) on the printed matter. Thus, the printed matter is not satisfactorily completed due to printing trouble.

From this page layout, in the print server 12, the image that will cause such printing trouble is detected by the image detection component 28.

In order to detect whether the image is a compressed image or not, a keyword for decompressing the compressed data described by a printer description language such as DCTDecode may be detected. The first several bytes of the image data may be read. It may be determined whether the several bytes constitute a header of a compressed image format or not to detect whether the image is a compressed image or not. In addition, the detection may be performed by determination using information provided by software for interpreting the printer description language. The method of detecting a compressed image is not limited to the above method, and an optional method may be used.

When an image detected by the image detection component 28 is on the page layout, the notification component 30 notifies the client terminal 16, which outputs the print job.

The process setting component 32 sets a process to the image (image data) detected by the image detection component 28.

At this time, the process setting component 32 can select, as the process to the detected image, a print output obtained by deleting the detected image from the page layout or a print output of only the detected image. In the process setting component 32, the detected image is converted into a predetermined warning color, or the peripheral portion of the detected image is outlined with the warning color (i.e., the detected image has an outline added thereto), so that the image can be printed out.

In the image processing component 24, image processing is performed to obtain a print output based on the setting made by the process setting component 32. At this time, in the image processing component 24, the page layout is separated into image data of respective CMYK color components to generate Raster data.

In the image processing component 24, processing to a compressed image to obtain an original color image can also be performed.

The image processing component 24 has a general configuration for performing a RIP process, which generates Raster data obtained by separating the page layout into CMYK color components. The image processing component 24 is not limited to this configuration. An optional configuration, which can obtain a print output depending on a page layout, can be applied to the image processing component 24.

An outline of a process for a compressed image or a page layout including a compressed image in the print server 12 will be described below.

When page layouts or the like made by the client terminal 16 are input to the print server 12, the print server 12 loads the settings of various print functions and detects a compressed image from the page layouts.

Figure 2:
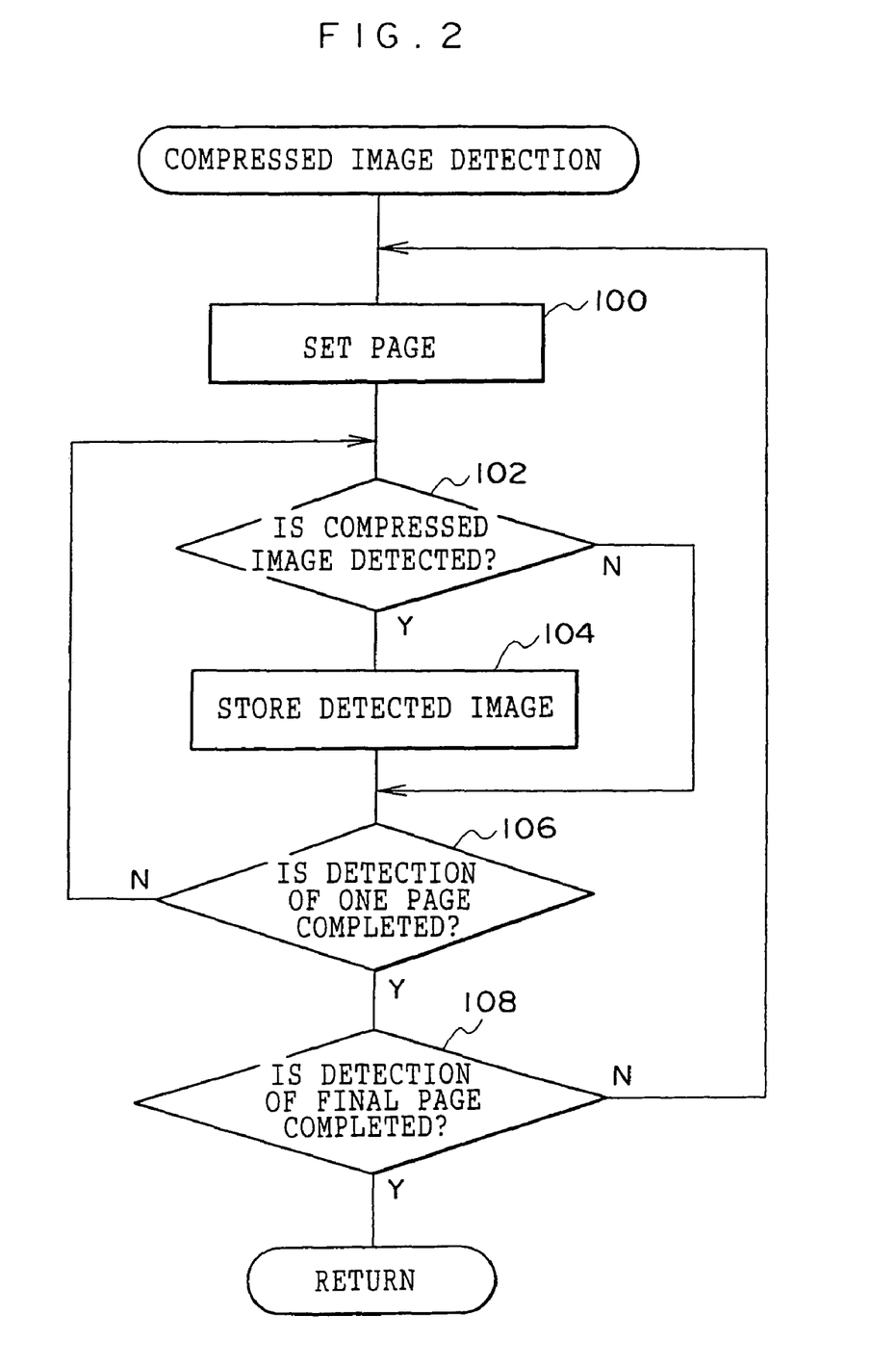
FIG. 2 is a flow chart showing an example of a detection process for detecting a compressed image.

FIG. 2 shows an outline of detection of a compressed image. In this flow chart, a page setting is performed in the first step 100. In this page setting, when page layouts include a plurality of pages, page settings are sequentially performed from the first page to detect compressed images from all the page layouts.

When the page setting is performed in step 100, a compressed image obtained by compressing image data by JPEG format is detected from the page layout of the set page in the next step 102. Since an optional method can be used to detect the compressed image, a description thereof will be omitted.

When the compressed image is detected, the print controller 20 determines affirmative in step 102 to shift to step 104. In step 104, information that can specify the detected compressed image is acquired and stored in a memory.

In step 106, the print controller 20 checks whether detection of compressed images of one page is completed or not. Upon completion of the detection of compressed images of one page, an affirmative determination is made in step 106 and the process shifts to step 108. In step 108, the print controller 20 checks whether detection of the compressed image of the final page is completed or not. If the detection is not completed, the print controller 20 determines negative and returns the process to step 100, and a process for the next page is started.

In the print server 12, when detection of the compressed images is completed as described above, a process setting for a compressed image is performed.

Figure 3A:
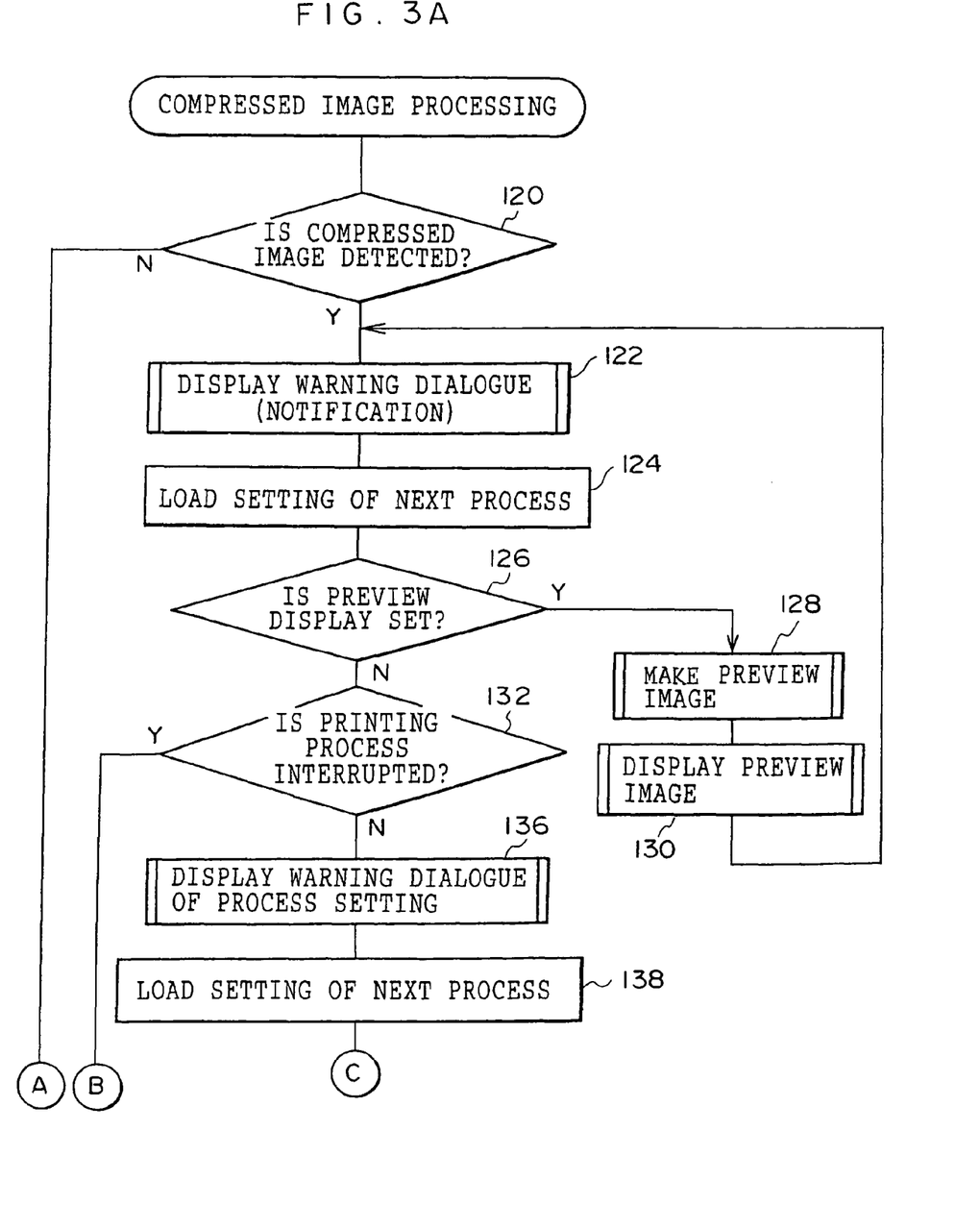
FIGS. 3A and 3B are flowcharts showing an example of processing for the detected compressed image.
Figure 3B:
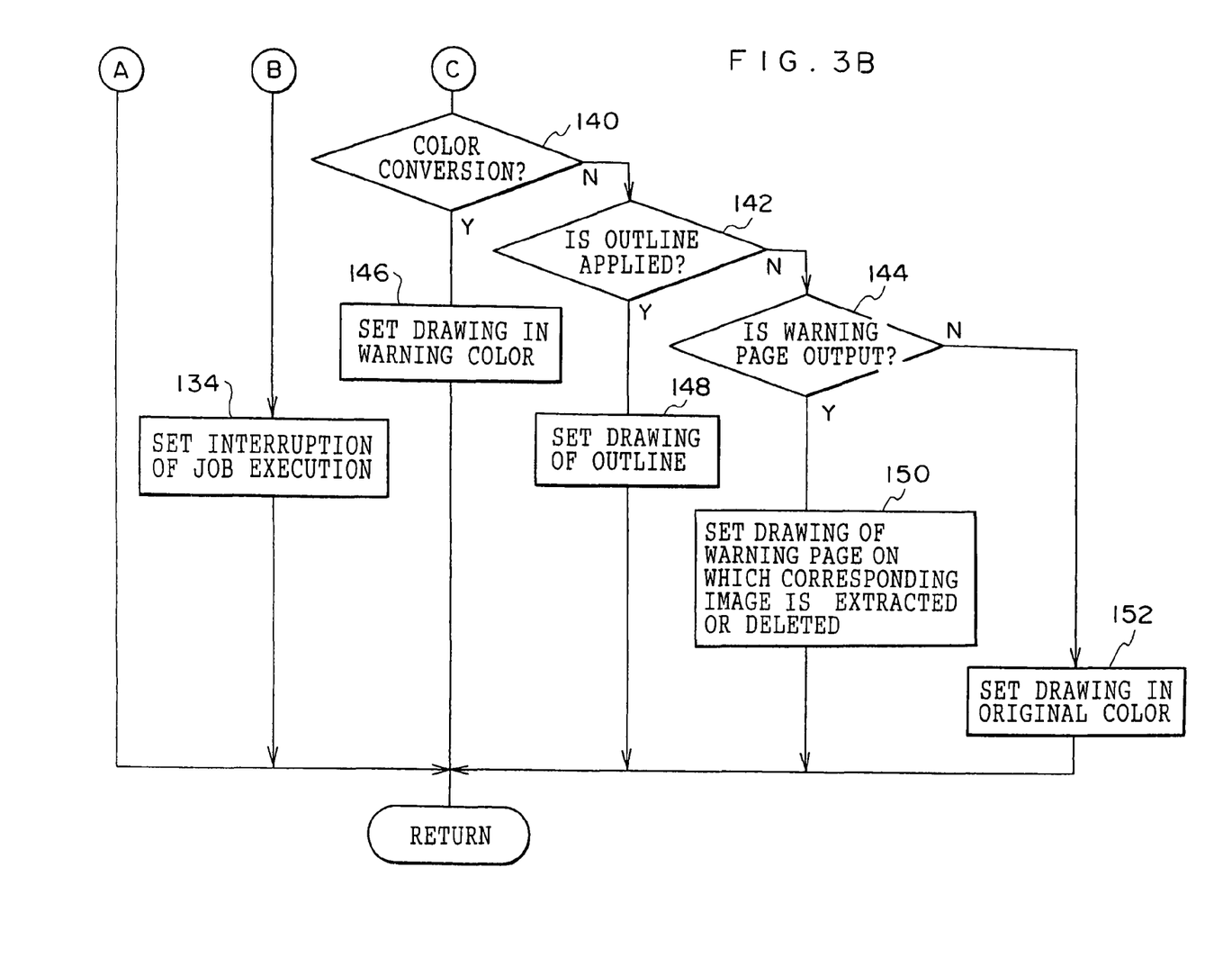

FIGS. 3A and 3B show an example of compressed image processing. The processing of the flow chart is executed upon completion of the detection of a compressed image. In the first step 120, it is checked whether a compressed image has been detected or not. More specifically, it is checked whether information for specifying the detected compressed image is saved or not. When no compressed image is detected, negative is determined in step 120, and the processing is completed, and a normal printing process (image processing) in the image processing component 24 for the print job is executed.

When the compressed image is detected, affirmative is determined in step 120 and the process 20 shifts to step 122 to perform a notification process. In this notification process, for example, the dialogue of a warning message is displayed on the monitor of the client terminal 16.

Figure 4A:
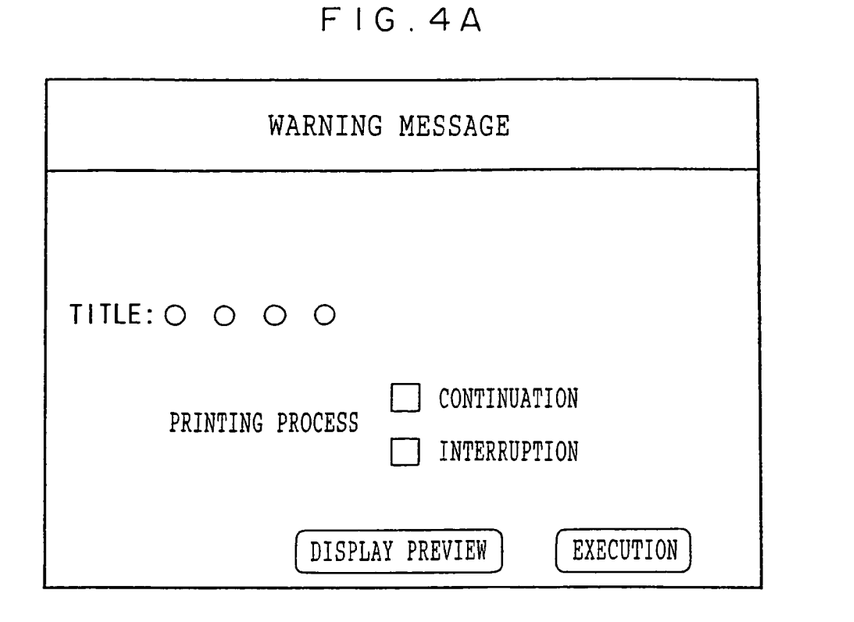
FIG. 4A is a schematic diagram showing a dialogue used as an example of a notification component.

FIG. 4A shows an example of the dialogue of the warning message. In this dialogue, a warning indicating that a compressed image is included is performed, and, as the next processes, settings such as display of a preview image, continuation of a printing process, and interruption of the printing step can be performed.

In the flow chart shown in FIGS. 3A and 3B, when the next process is set on the basis of the dialogue displayed on the monitor of the client terminal 16, the print controller 20 shifts to step 124 to load the set process and checks whether the preview display is set or not.

In this case, when the preview display is set, affirmative is determined in step 126 to shift to step 128 and make a preview image showing a compressed image based on the information for specifying a stored compressed image. In step 130, the made preview image is output to the client terminal 16 to be displayed on the monitor of the client terminal 16.

In this manner, from the preview image displayed on the monitor, the compressed image on the page layout can be appropriately determined.

When the preview display is not selected or is ended, a setting of the next process is input. In this case, the print controller 20 determines negative in step 126 to shift to step 132. In step 132, the print controller 20 checks whether the interruption of the printing process is selected or not. When the interruption of the printing process is selected, the print controller 20 determines affirmative in step 132 to shift to step 134 and sets the interruption of the printing process.

In contrast to this, when the continuation of the printing process is designated, negative is determined in step 132 to shift to step 136. In step 136, a dialogue for requesting an input of a detailed process to a compressed image or a page layout including a compressed image is displayed on the monitor of the client terminal 16.

Figure 4B:
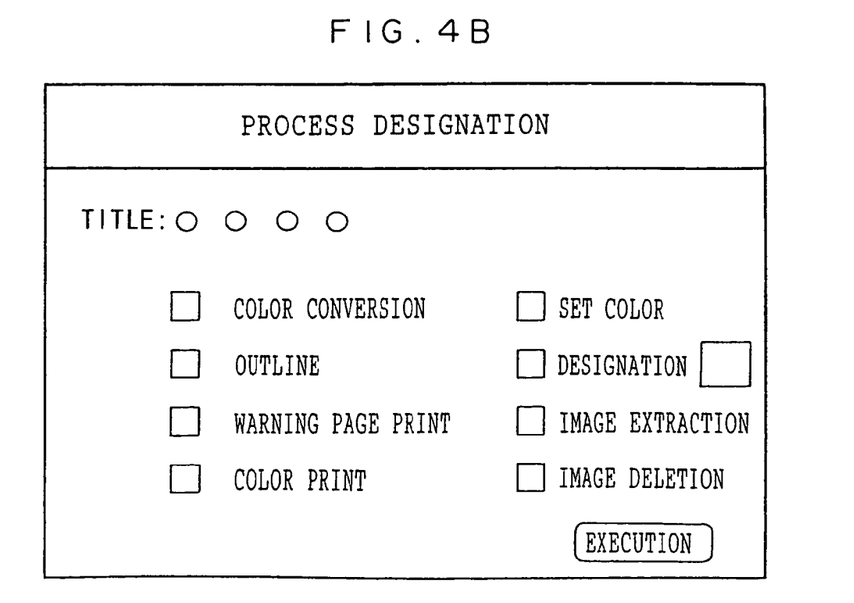
FIG. 4B is a schematic diagram showing a dialogue used as an example of process selection.

FIG. 4B shows an example of the dialogue displayed at this time. In this dialogue, a method of performing color conversion to a compressed image to distinguish the compressed image or a method of applying an outline to the compressed image to distinguish the compressed image can be selectively set. In addition, colors used when color conversion is performed or when an outline is applied can be set.

More specifically, the method of making a compressed image clear by a warning color or the method of making a compressed image clear by applying an outline of a warning color can be selected. At this time, as the warning color, a preset color (e.g., magenta) can be used, or an optionally set color can also be used.

Designation of a printing process is input by using the dialogue or the like displayed on the monitor of the client terminal 16 and the setting is loaded in step 138. Thereafter, it is checked in step 140 whether the color conversion is set or not, and it is checked in step 142 whether the outline is set or not.

When the color conversion is designated, affirmative is determined in step 140 to shift to step 146, and the detected compressed image is set to be drawn in the designated warning color.

The image processing component 24 performs image processing to obtain a print output set for a compressed image. In this manner, when a setting is performed such that drawing is performed by performing color conversion to the compressed image, the compressed image is printed out in the set color and not in the original color. The set color is the K-color, i.e., black in the initial state. The initial state is set to be equal to that obtained when a compressed image is a K-color image and when the image is separately output by a DTP application for printing using a machine plate.

When it is designated that an edge line is applied, negative is determined in step 140, affirmative is determined in step 142, and the process shifts to step 148. In step 148, a setting is performed such that a compressed image is printed out with an outline of the designated color. At this time, the image inside the outline is the original color image.

Furthermore, when an output of a warning page is designated, negative is determined in steps 140 and 142, affirmative is determined in step 144, and the process shifts to step 150. In step 150, a setting for deleting the compressed image or for extracting the compressed image is loaded, and a warning page depending on the setting is drawn.

More specifically, when the image extraction is designated, only a compressed image is extracted from the page layout, and the compressed image is set to be printed out as an original color image. When the image deletion is designated, a compressed image is deleted from the page layout, and a setting is performed such that a print output, which does not include the compressed image, is obtained. When the compressed image is extracted and printed out, only the compressed image is not extracted, and the peripheral portion of the compressed image may be extracted in a predetermined region and printed output according to the compressed image. In this manner, the compressed image on the page layout can be more clearly shown.

As described above, in the print server 12, when a compressed image is arranged on a page layout, the compressed image can be printed out such that the compressed image becomes distinguished. For this reason, a printed matter can be reliably prevented from being defective when a user makes a machine plate without knowing that the compressed image is on the page layout and performs a printing process.

When a color print is designated, negative is determined in steps 140, 142, and 144 each, and the print controller 20 shifts to step 152. In step 152, a setting is performed such that even a compressed image can be drawn as an original color image.

When the setting is performed as described above, as a printed matter output from the printer 14, a printed matter depending on a color image on a page layout can be obtained regardless of the presence/absence of a compressed image.

As described above, in the print server 12 arranged in the print system 10, when a preset image such as a compressed image is arranged on a page layout made by the client terminal 16, the image is detected and notified to the client terminal 16. For this reason, a printing accident can be reliably prevented from being caused in a printed matter when a user performs a printing process by making a machine plate despite use of the compressed image.

Since a proof operation for checking an arrangement or the like of images can be prevented from being interrupted because a compressed image is arranged on a page layout.

In addition, in the print server 12, when the compressed image is detected, the compressed image is printed out by various methods to make it possible to apparently specify the compressed image. For this reason, in the client terminal 16, an operation of converting the compressed image into an uncompressed image or the like can be easily and apparently performed.

Furthermore, in the print server 12, finish of printing can be checked regardless of the presence/absence of a compressed image, as a matter of course, and finish can also be checked when a user performs a printing process by using a machine plate without knowing a compressed image.

In this embodiment, although the dialogue shown in FIGS. 4A and 4B is used to warn and set a process, a demand for the warning and the process setting is not limited to the dialogue. For example, one of the warning and the process setting may be supported by one dialogue, and a dialogue of a layout of arbitrary values can also be used.

In this embodiment, a process performed when a preset image such as a compressed image is detected is preset on the print server 12 or the client terminal 16 to perform the set process, so that the detected image may be notified.

Figure 5:
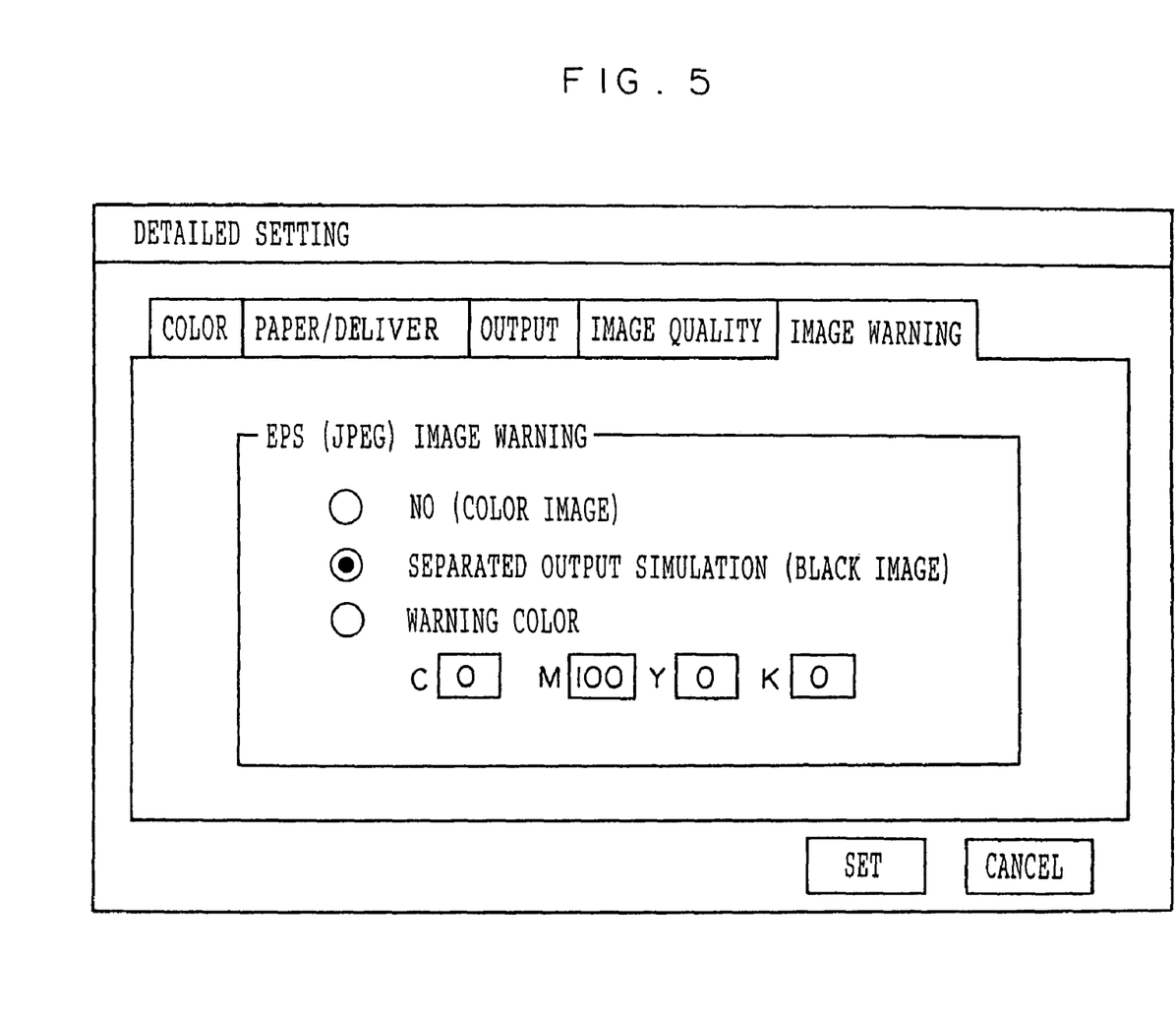
FIG. 5 is a schematic diagram showing a dialogue illustrating another example of process selection for a compressed image.

In this case, a dialogue for warning an EPS (JPEG) image as shown in FIG. 5 is used as a user interface, and the dialogue is displayed on the monitor of the client terminal 16, so that a process for the compressed image can be set in advance. In the dialogue shown in FIG. 5, as an example of the process for the compressed image, any one of drawing by a "warning color", "separate output simulation" which prints out a K-color image similar to an image obtained by printing using a machine plate, and "No (color image)" which draws an image as a color image to make it possible to check a page layout can be selected and designated.

When the process is set in advance as described above, the process flow shown in FIG. 6 can be achieved. More specifically, when a process for a print job is performed, it is checked in step 160 whether EPS (JPEG) image warning is turned on or not.

Figure 6:
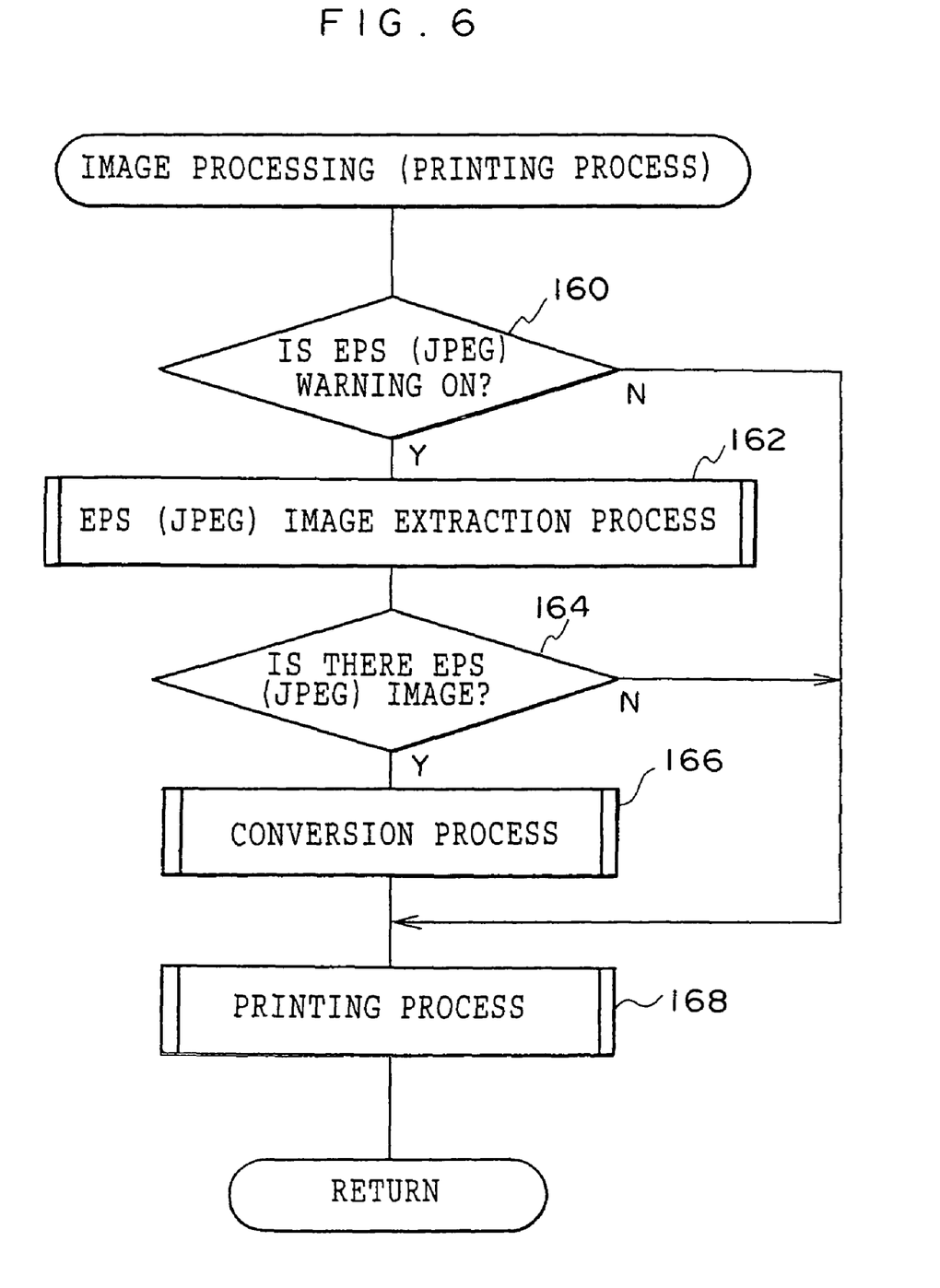
FIG. 6 is a flow chart showing an example of a process using the dialogue shown in FIG. 5.

In this case, when the EPS (JPEG) image warning is turned on, affirmative is determined in step 160, and the print controller 20 shifts to step 162 to perform an image extraction process (for example, the processes corresponding to the processes of the flow chart in FIG. 2).

Thereafter, it is checked in step 164 whether a compressed image is extracted or not. When the compressed image is extracted, affirmative is determined in step 164, and the process shifts to step 166 to perform a conversion process for the compressed image as shown in FIGS. 3A and 3B.

After the conversion process is completed as described above, the print controller 20 may shift to step 168 to perform a printing process to a print job.

The embodiments described above do not limit the configuration of the invention. For example, in the embodiments, the print server 12 is illustrated as an image processing device to which the invention is applied. However, the invention is not limited to the embodiments. For example, an optional image process device such as an intermediate server dedicated to image processing can be applied as a print server.

What is claimed is:

1. An image processing device including a hardware processor, comprising:
   a receiving component that receives a page layout including a plurality of images;
   a detection component that detects a compressed image that has been subjected to data compression in the page layout; and
   a warning component that, in a case that the detection component detects the compressed image, executes a process on the page layout that clarifies for a user a position in the page layout of the detected compressed image, warns the user that the page layout includes the compressed image by outputting the page layout on which the process is executed, and requests an image processing terminal to display a next processing option for the page layout that includes a conversion process that converts a color of the compressed image to a color for warning, the color for warning being a color that clarifies for the user whether the page layout includes the compressed image or not.

2. The image processing device according to claim 1, wherein the warning component notifies an image processing terminal to display information indicating that the page layout includes the compressed image.

3. The image processing device according to claim 1, further comprising:
   a conversion component that executes a conversion process to the page layout in a case that the detection component detects that the page layout includes the compressed image, the conversion process including the process to clarify for the user whether the page layout includes the compressed image or not,
   wherein the warning component notifies a printing device to output the page layout processed by the conversion component on a recording medium.

4. The image processing device according to claim 1, wherein the next processing option includes at least one process selectable by the user.

5. The image processing device according to claim 1, wherein the color for warning is selectable by the user.

6. The image processing device according to claim 4, wherein the next processing option includes at least one of an interruption process that interrupts a print processing of the page layout and a continuation process that continues the print processing of the page layout.

7. The image processing device according to claim 1, further comprising:
   a preview display setting that determines whether an option to display a preview image of the page layout that includes the compressed image is set or not in the circumstance that the warning component notifies the user, wherein if the display of a preview image is set, then the preview image appears to the user.

8. The image processing device according to claim 1, further comprising:
   a print controller that determines whether interruption of a printing process is set or not in a circumstance that the warning component warns the user that the page layout includes the compressed image,
   wherein if interruption of the printing process is selected, the printing process is interrupted.

9. The image processing device according to claim 1, further comprising:
   a first dialogue that appears to the user that notifies the user whether the page layout includes the compressed image or not, the first dialogue including a selection component that enables the user to select a conversion process of the compressed image, and
   a conversion component that converts the compressed image based on the selection by the user.

10. A non-transitory computer readable medium storing a program causing a computer to execute a process for an image processing, the process comprising:
   receiving a page layout including a plurality of images;
   detecting a compressed image that has been subjected to data compression in the page layout; and
   executing, in a case that the compressed image is detected, a process on the page layout that clarifies for a user a position in the page layout of the detected compressed image, warning the user that the page layout includes the compressed image by outputting the page layout on which the process is executed, and requesting an image processing terminal to display a next processing option for the page layout that includes a conversion process that converts a color of the compressed image to a color for warning, the color for warning being a color that clarifies for the user whether the page layout includes the compressed image or not.

11. The image processing process according to claim 10, wherein when the user is warned that the page layout includes the compressed image, an image processing terminal displays information indicating that the page layout includes the compressed image.

12. The image processing process according to claim 10, further comprising:
   executing a conversion process to the page layout in a case that it is detected that the page layout includes the compressed image, the conversion process including processing to clarify for the user whether the page layout includes the compressed image or not,
   wherein a printing device is notified to output the page layout processed by the conversion component on a recording medium.

13. The image processing process according to claim 10, wherein the next processing option includes at least one process selectable by the user.

14. The image processing process according to claim 10, wherein the color for warning is selectable by the user.

15. The image processing process according to claim 13, wherein the next processing option includes at least one of an interruption process that interrupts a print processing of the page layout and a continuation process that continues the print processing of the page layout.

16. The image processing process according to claim 10, further comprising:
   determining whether an option to display a preview image of the page layout that includes the compressed image is set or not in the circumstance that a warning component warns the user, wherein if the display of a preview image is set, the preview image appears to the user.

17. The image processing process according to claim 10, further comprising:
   determining whether interruption of the printing process is set or not in the circumstance that a warning component warns the user that the page layout includes the compressed image,
   wherein if interruption of a printing process is selected, the printing process is interrupted.

18. The image processing process according to claim 10, further comprising:
   a first dialogue appearing to the user that notifies the user of whether the page layout includes the compressed image or not, the first dialogue including a selection component that enables the user to select a conversion process of the compressed image; and
   converting the compressed image based on the selection by the user.

* * * * *